May 7, 1935.  W. BAUERSFELD  2,000,737
MICROSCOPE STAND
Filed Dec. 7, 1933

Inventor:
Walther Bauersfeld

Patented May 7, 1935

2,000,737

UNITED STATES PATENT OFFICE 2,000,737

MICROSCOPE STAND

Walther Bauersfeld, Jena, Germany, assignor to the firm of Carl Zeiss, Jena, Germany Application December 7, 1933, Serial No. 701,263
In Germany December 13, 1932

2 Claims. (Cl. 88—39)

I have filed applications in Germany, December 13, 1932, and in Japan, June 30, 1933.

The coarse focusing adjustment of the optical observation parts of microscopes, which necessarily has to cover a long way, is frequently effected by means of racks and pinions disposed in the microscope stand. As the range of displacement at the disposal of the fine focusing adjustment is largely restricted in the known microscope stands, the invention aims at considerably increasing this range, and at attaining a great simplicity of construction, by mounting a transmitting gear between the pinion in mesh with the rack and the hand-operated driving organ for the fine focusing adjustment. Accordingly, the new microscope stand offers the advantage of a stand having means for the coarse and the fine focusing adjustment, and this in spite of its being equipped with one guide and one driving organ only. To avoid that making use of these advantages entails the necessity of having the driving organs effect many revolutions when the optical observation parts are to be displaced a long way, for instance when the microscope objective is to be changed, the coarse and the fine focusing adjustment may be provided with one driving organ each, both these driving organs influencing the pinion in mesh with the rack, and this eventually in such a manner that the pinion is rotated direct by the driving organ for the coarse adjustment and through the agency of the transmitting wheel gear by the driving organ for the fine adjustment.

Figure 1:
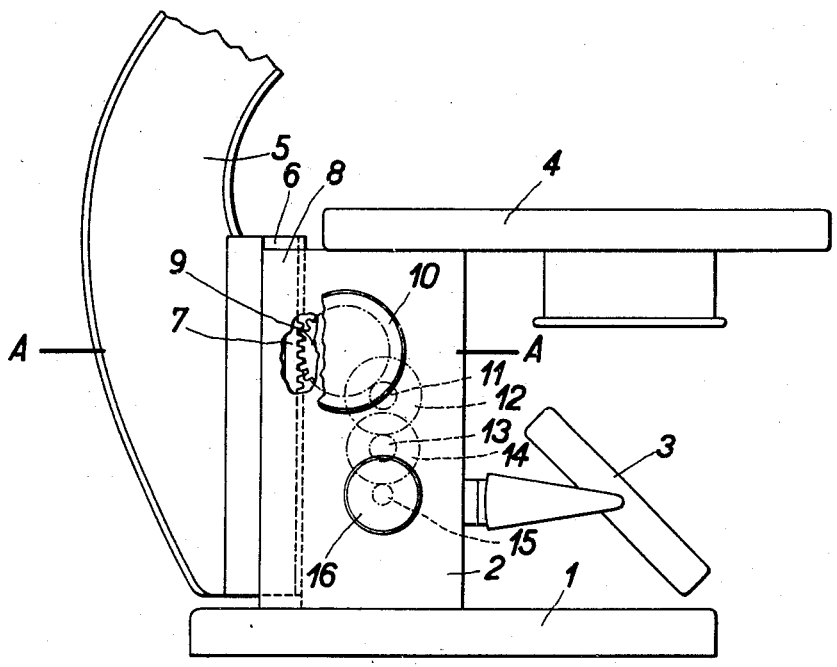
Figure 2:
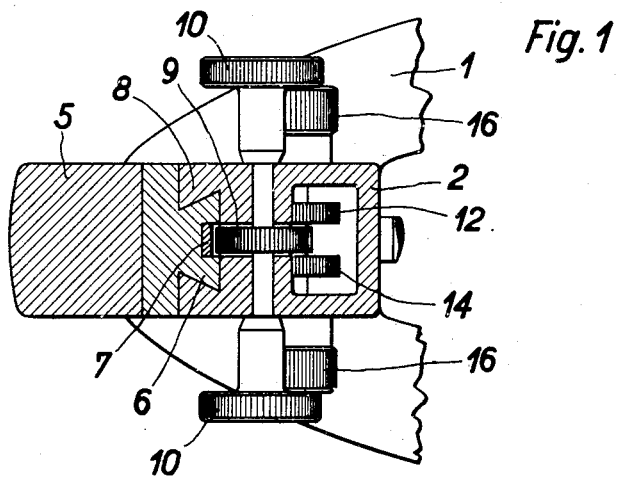

The accompanying drawing, which represents the part in question of a microscope stand, illustrates a constructional example of the invention. The said part is shown by Figure 1 in elevation and by Figure 2 in a section through the line A—A in Figure 1.

The stand has a foot 1 supporting a gear housing 2 to which is attached an adjustable illuminating mirror 3 and an object stage 4. A pillar bracket 5, supports the optical observation parts. To this pillar bracket 5 is fixed a slide 6 having a rack 7. The slide 6 may be adjusted up and downwardly in a guide 8 on the gear housing 2. The rack 7 meshes with a toothed wheel 9 whose axle is connected to two milled heads 10. The toothed wheel 9 cooperates with a toothed wheel 11 which is fast with a toothed wheel 12 in mesh with a toothed wheel 13. This toothed wheel 13 is fast with a toothed wheel 14 cooperating with a toothed wheel 15. The axle of the toothed wheel 15 is connected to two milled heads 16. The toothed wheels 10, 11, 12, 13, 14 and 15 have such a transmission that a complete revolution of the milled heads 16 entails a rotation of the toothed wheel 9 through a small angle only.

When the microscope stand is in use, the milled heads 10 serve for the coarse and the milled heads 16 for the fine up and down adjustment of the pillar bracket 5 and the optical observation parts of the microscope. Both kinds of adjustment displace the slide 6 in the guide 8. A rotation of the milled heads 16 entails a rotation of the milled heads 10 and vice versa. It may be advisable to dispense entirely with the milled heads 10 for the coarse adjustment and to adjust by means of the milled heads 16 only.

I claim:

1. A microscope stand comprising a foot, a milled head rotatably mounted in the foot, a toothed wheel connected to the milled head, a rack displaceably mounted on the foot, a toothed wheel rotatably mounted in the foot and meshing with the rack, a gear consisting of a plurality of toothed wheels disposed between the toothed wheel connected with the milled head and the toothed wheel in mesh with the rack, another milled head rotatably mounted in the foot, and driving means disposed between this other milled head and the rack.

2. A microscope stand comprising a foot, a milled head rotatably mounted in the foot, a toothed wheel connected to the milled head, a rack displaceably mounted on the foot, a toothed wheel rotatably mounted in the foot and meshing with the rack, a gear consisting of a plurality of toothed wheels disposed between the toothed wheel connected with the milled head and the toothed wheel in mesh with the rack, and another milled head connected to that of the toothed wheels in mesh with the rack which is driven by the toothed wheel connected to the first said milled head.

WALTHER BAUERSFELD.